United States Patent
Baik et al.

(10) Patent No.: US 7,126,793 B2
(45) Date of Patent: Oct. 24, 2006

(54) HEAD DRUM ASSEMBLY FOR A TAPE RECORDER

(75) Inventors: Chung-hum Baik, Suwon (KR); Tae-gil Kang, Suwon (KR); Sung-hee Hong, Suwon (KR); Do-young Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 211 days.

(21) Appl. No.: 10/686,539

(22) Filed: Oct. 16, 2003

(65) Prior Publication Data

US 2004/0125507 A1   Jul. 1, 2004

(30) Foreign Application Priority Data

Oct. 16, 2002  (KR) ............. 10-2002-0063070
Dec. 26, 2002  (KR) ............. 10-2002-0084575
Dec. 31, 2002  (KR) ............. 10-2002-0088235

(51) Int. Cl.
*G11B 5/52* (2006.01)

(52) U.S. Cl. ................................. 360/271.1

(58) Field of Classification Search ............ 360/271.1, 360/271.5, 271.7, 271.8, 271.9, 281.1, 281.7
See application file for complete search history.

(56) References Cited

U.S. PATENT DOCUMENTS

| | | | |
|---|---|---|---|
| 4,564,876 A * | 1/1986 | Takahashi et al. | 360/291.6 |
| 4,641,214 A * | 2/1987 | Imanishi et al. | 360/130.24 |
| 4,654,738 A | 3/1987 | Kato et al. | |
| 4,875,110 A * | 10/1989 | Kazama et al. | 360/64 |
| 4,891,726 A | 1/1990 | Suwa et al. | |
| 5,019,926 A | 5/1991 | Van Thuijl et al. | |
| 5,317,466 A * | 5/1994 | Hasegawa | 360/271.7 |
| 5,392,180 A | 2/1995 | Hasegawa | |
| 5,463,506 A * | 10/1995 | Mitsuyasu et al. | 360/77.17 |
| 5,764,442 A * | 6/1998 | Komatsu et al. | 360/271.7 |
| 5,798,891 A * | 8/1998 | Lee | 360/271.7 |
| 6,028,747 A * | 2/2000 | Lee | 360/281.7 |
| 6,369,991 B1 * | 4/2002 | Choi et al. | 360/271.7 |
| 6,426,852 B1 | 7/2002 | Chi | |
| 2001/0043442 A1 * | 11/2001 | Maemine | 360/271.5 |
| 2004/0042125 A1 * | 3/2004 | Matsui | 360/271.5 |

FOREIGN PATENT DOCUMENTS

| | | |
|---|---|---|
| CN | 1034084 A | 7/1989 |
| JP | 61-104418 | 5/1986 |
| JP | 61-160801 | 7/1986 |
| JP | 61-236014 | 10/1986 |
| JP | 62-016204 A | 1/1987 |
| JP | 02-206003 | 8/1990 |

(Continued)

*Primary Examiner*—Allen Cao
(74) *Attorney, Agent, or Firm*—Roylance, Abrams, Berdo & Goodman, LLP

(57) ABSTRACT

A head drum assembly for a compact-size camcorder such as a digital video camera comprised of a drum cover, stationary and rotating drum, a subcircuit board, a stationary and rotating transformer and a motor stator and rotor. By forming the drum cover, which is attached to the shaft of the rotary drum above the rotary drum, with a conductive material such as an aluminum alloy, the need for a conductive bushing member and earthing plate for the insulating drum cover of the head drum assembly can be omitted, resulting in an overall simpler. As the number of components and manufacturing steps decreases, the manufacturing costs decrease and productivity increases.

16 Claims, 8 Drawing Sheets

FOREIGN PATENT DOCUMENTS

| | | |
|---|---|---|
| JP | H2-149106 | 12/1990 |
| JP | 04-325864 | 11/1992 |
| JP | 10-322951 | 4/1998 |
| JP | 11-016107 | 1/1999 |
| JP | 2002-050015 | 2/2002 |
| KR | 1020010010684 | 2/2001 |

* cited by examiner

HEAD DRUM ASSEMBLY FOR A TAPE RECORDER

FOREIGN PRIORITY INFORMATION

This application claims priority under 35 U.S.C. § 119 to a Korean Patent Application, Ser. No. 2002-63070, filed in the Korean Intellectual Property Office on Oct. 16, 2002, to Korean Patent Application Ser. No. 2002-84575, filed in the Korean Intellectual Property Office on Dec. 26, 2002, and to Korean Patent Application, Ser. No. 2002-88235 filed in the Korean Intellectual Property Office on Dec. 31, 2002, the contents of all three said applications being incorporated herein by reference

BACKGROUND OF THE INVENTION

1. Field of the Invention

The present invention relates to an improved head drum assembly for use in a tape recorder such as a compact size camcorder of a digital video camera (DVC).

2. Description of the Related Art

Generally, in a tape recorder such as a compact size camcorder of a digital video camera or a video cassette recorder (VCR), in order to scan magnetic tape and thus record video data thereon and/or reproduce video data therefrom, a tape recorder deck includes a head drum assembly having a magnetic head rotatable at high speed.

Referring to FIGS. 1A and 1B, a conventional head drum assembly 100 for a tape recorder includes a rotary drum 110, a stationary drum 120 and a drum cover 130. The rotary drum 110 supports a magnetic head (h), which scans a moving magnetic tape (not shown) to record/reproduce video data thereon/therefrom, and is rotatably mounted on the shaft 140. The stationary drum 120 and the drum cover 130 are press-fitted to be placed on the lower and the upper parts of the shaft 140, respectively, with the rotary drum 110 being interposed therebetween.

The drum cover 130 includes a conductive bushing member 131 in a form of a flange which is press-fitted in the shaft 140 so as to be positioned on the rotary drum 110, a cover member 132 formed by a resin molding and joined with the bushing member 131 by a pair of screws (s), and a conductive earth plate 133 supported by one of the screws (s) to be exposed through the upper surface of the cover member 132 and electrically connected to the sub circuit board 153.

Between the drum cover 130 and the rotary drum 110, a rotary transformer 152 and a stationary transformer 151 facing the rotary transformer 152 are disposed to transmit the signals recorded/reproduced on/from tape by the magnetic head (h). In order to connect the magnetic head (h) and the coil (c) of the rotary transformer 152 through soldering, a terminal 155 is preferably interconnected therebetween as a medium because direct soldering is not easy. Accordingly, in order to enable easy soldering of the coil (c) first, terminal 155 is attached to the lower part of the rotary transformer 152. Next, a hole 115 is defined in the rotary drum 110, and the upper part of the terminal pin 111 is attached to the terminal 115. Next, one end of the coil (c) is soldered to the connecting area between the terminal 155 and the terminal pin 111. As shown in FIG. 2A, the lower end of the terminal pin 111 is soldered to a fine patter coil (FPC) 117 which is disposed at the lower part of the rotary drum 110. Of course, the FPC 117 is connected to the magnetic head (h) by soldering.

To the lower part of the rotary drum 110 is provided a motor rotor 160 which has a donut-shaped magnet 162 disposed within a ring-type rotor casing 161 thereof, and to the upper part of the stationary drum 120, a motor stator 170 is mounted. The motor stator 170 is formed in a type in which the so-called FP coil (fine pattern coil) is formed into a disc pattern and disposed to face the donut-type magnet 162 to obtain a result of a more compact-sized head drum assembly 100. Such motor stator 170 usually has the three-layered structure consisting of first substrate 171, a second substrate 172 and a third substrate 17 which are stacked on one another in turn.

With regard to the motor stator 170, there is a torque generation coil pattern (A) formed on the first and second substrates 171, 172, while a frequency generation coil pattern (B) for speed control and a phase generation coil pattern (C) for phase control is formed on the third substrate 173.

As shown in FIG. 2C, the first substrate 171 is formed of a structure in which a copper membrane 171b in fine pattern is formed on an epoxy substrate 171a, i.e., on a base plate, and a protective layer 171c is formed thereon. The second and the third substrates 172 and 173 are formed in the same structure.

In the head drum assembly 100 constructed as above, the rotary drum 110 is rotated by the electromagnetic interaction between the motor rotor 160 and the motor stator 170. As the rotary drum 110 is rotated, the magnetic head (h) mounted in the rotary drum 110 is also subsequently rotated, thereby scanning the tape and recording/reproducing data on/from the magnetic tape. The data obtained from the scanning of the magnetic head (h) is transmitted to the rotary transformer 152 and the stationary transformer 151 via the terminal pin 111 and the coil (c), and then to the camcorder system via the sub circuit board 153, which is connected to the stationary transformer 151. The data is then processed at the camcorder system. Reference numerals 140a and 140b denote bearings, and 141 an elastic member, respectively.

However, the conventional head drum assembly 100 constructed as above for use in the tape recorder is accompanied with the following drawbacks:

First, because the cover member 132 is formed of an insulating resin through a molding process, the conductive bushing member 131 and the screws (s) are required to ensure stable electric connection between the sub circuit board 153 and the earth plate 133 for a stable earthing of the head drum assembly 100.

Additionally, because the drum cover 130 requires various components such as the bushing member 131, the cover member 132, the earth plate 133, and a pair of screws (s) to connect the related parts, the number of manufacturing steps such as soldering of the earth plate 133 with respect to the sub circuit board 153, or bonding of the cover member 132 to the bushing member 131, are also increased. As a result, due to increased number of necessary parts and manufacturing steps, productivity deteriorates while the manufacturing costs increase.

Second, a significant amount of components and manufacturing steps are also required in order to connect the magnetic head (h) and the coil (c) of the rotary transformer 152. The terminal 155 has to be attached to, and the hole 115 has to be formed in, the rotary drum 110, so that the upper part of the terminal pin 111, the terminal 155 and the coils (c), can be connected through the hole 115. Then, the lower part of the terminal pin 111 is attached to the FPC 117 which is disposed at the lower part of the rotary drum 110, and the FPC 117 is connected to the magnetic head (h) by soldering.

Furthermore, because signal connection between the rotary transformer 152 and the magnetic head (h) can be achieved only after a plurality of processes, signal transmission rate is degraded, and thus performance of the product deteriorates.

Third, because the motor stator 170 is formed in the three-layered structure having the first substrate 171, the second substrate 172 and the third substrate 173, each of which are bonded to one another in turn, the number of parts and manufacturing steps increase and manufacturing costs increase. Furthermore, the copper patterning on the respective substrates also causes decreased productivity.

SUMMARY OF THE INVENTION

Accordingly, it is an aspect of an embodiment of the present invention to provide a head drum assembly for a tape recorder, which provides an improved productivity at a reduced manufacturing cost through an improvement to the structure of a drum cover thereof.

It is another aspect of an embodiment of the present invention to provide a head drum assembly for a tape recorder, which is improved in a connecting structure for a rotary transformer and a magnetic head.

It is yet another aspect of an embodiment of the present invention to provide a head drum assembly for a tape recorder, which provides improved manufacturing processes at a reduced manufacturing cost through an improvement to the structure of a motor stator.

In order to achieve the above aspects, an embodiment of present invention provides a head drum assembly for a tape recorder, including a rotary drum supporting a magnetic head thereon and being rotatably disposed on a shaft, a stationary drum and a drum cover secured to the shaft to be positioned respectively on lower and upper parts of the rotary drum with the rotary drum being interposed therebetween, a sub circuit board. The embodiment of the invention further includes a stationary transformer and a rotary transformer, each being disposed between the stationary drum and the rotary drum for signal transmission with the magnetic head, a motor stator mounted on the stationary drum, and a motor rotor disposed in the rotary drum to oppose the motor stator and rotate.

The drum cover is formed of a conductive material and is press-fitted to contact with the shaft, and a connecting member is disposed on the conductive body of the drum cover for supporting and electrically connecting the sub circuit board with the conductive body.

The drum cover is formed of the same or similar material as that of the rotary drum and the stationary drum.

The connecting member is a screw fastened to coupling holes which are respectively formed in the drum cover and in the sub circuit board to correspond to each other.

The rotary drum has a linking hole vertically penetrating therein, and a coil of the rotary transformer is passed through the linking hole and directly connected to the magnetic head by soldering.

An entry part and an exit part at the upper and the lower parts of the linking hole are rounded, or may be tapered.

The linking hole is formed symmetrically with respect to the magnetic head.

The motor stator is formed in a two-layered structure having a lower substrate and an upper substrate stacked on the lower substrate. Combinations of a torque generation coil pattern, a frequency generation coil pattern for speed control and a phase generation coil pattern for phase control are formed on the upper and the lower substrates, respectively.

The torque generation coil pattern is formed dispersely on the upper and the lower substrates, and the phase generation coil pattern for phase control is formed on one of the upper and the lower substrates, and the frequency generation coil pattern for speed control is formed on the other.

The torque generation coil pattern and the phase generation coil pattern are formed dispersely on the upper and the lower substrates, and the frequency generation coil pattern is formed on the lower substrate.

Each of the upper and the lower substrates has a copper layer in a predetermined pattern which is formed on a base plate, and a protective layer formed on the copper layer, and the copper layers of the upper and the lower substrates are connected with each other through a passing hole formed in the upper substrate.

The copper layer is formed in width from about 10 μm to about 20 μm, and a pitch between the respective copper layers ranges from about 90 μm to about 100 μm.

With the head drum assembly for a tape recorder constructed as described above in accordance with an embodiment of the present invention, the conductive bushing members and earth plate, which were respectively provided to the insulating drum cover, can be replaced by a single conductive drum cover. Accordingly, the number of necessary parts and manufacturing steps is reduced, and the manufacturing cost decreases while the productivity increases.

Further, because the coil is directly connected to the magnetic head, many parts become unnecessary, and as a result, the number of manufacturing steps decreases. Also, as the signal transmission rate increases due to direct connection between the coil and the magnetic head, the performance of the product is improved.

Furthermore, because the motor stator adopts a two-layered structure of an upper and lower substrates, i.e., omitting one layer from the conventional structure, the number of necessary parts is reduced, and subsequently, the manufacturing costs are also decreased. Additionally, because the process of forming copper pattern on the respective substrate layers can be shortened, productivity is increased.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENTS

Hereinafter, an embodiment of the present invention will be described in detail with reference to the accompanying drawings.

Figure 1A:
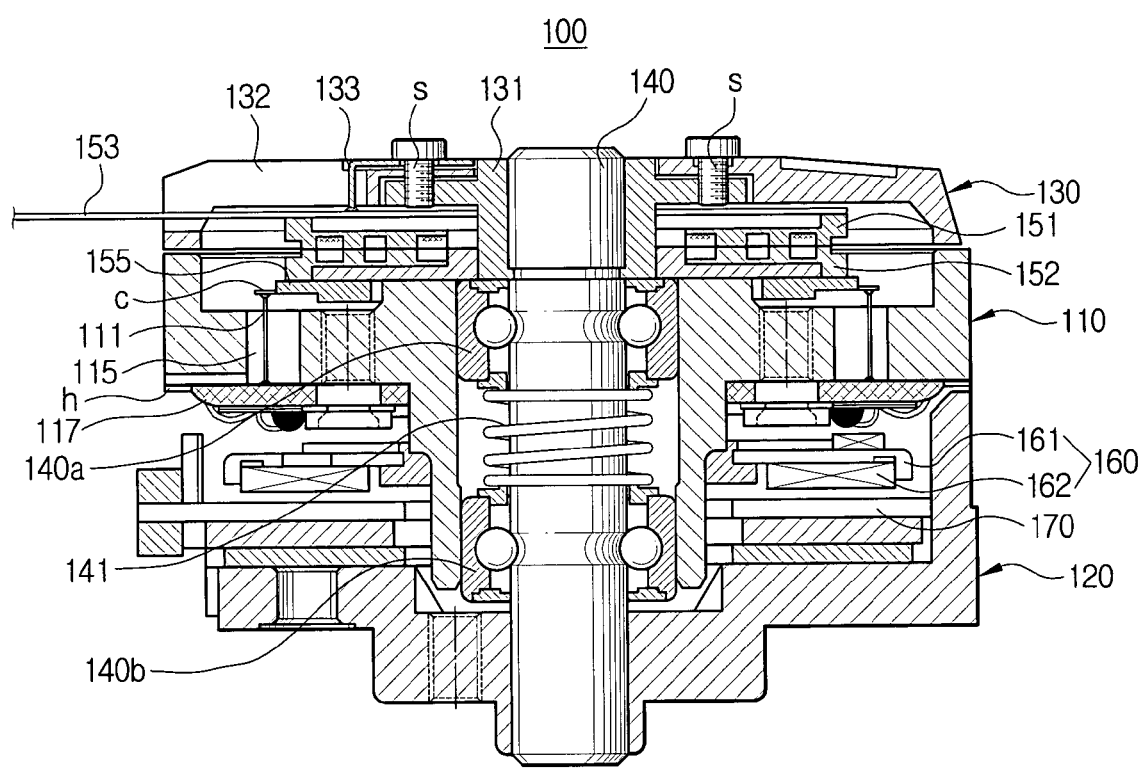
FIG. 1A is a schematic sectional view of a conventional head drum assembly.
Figure 1B:
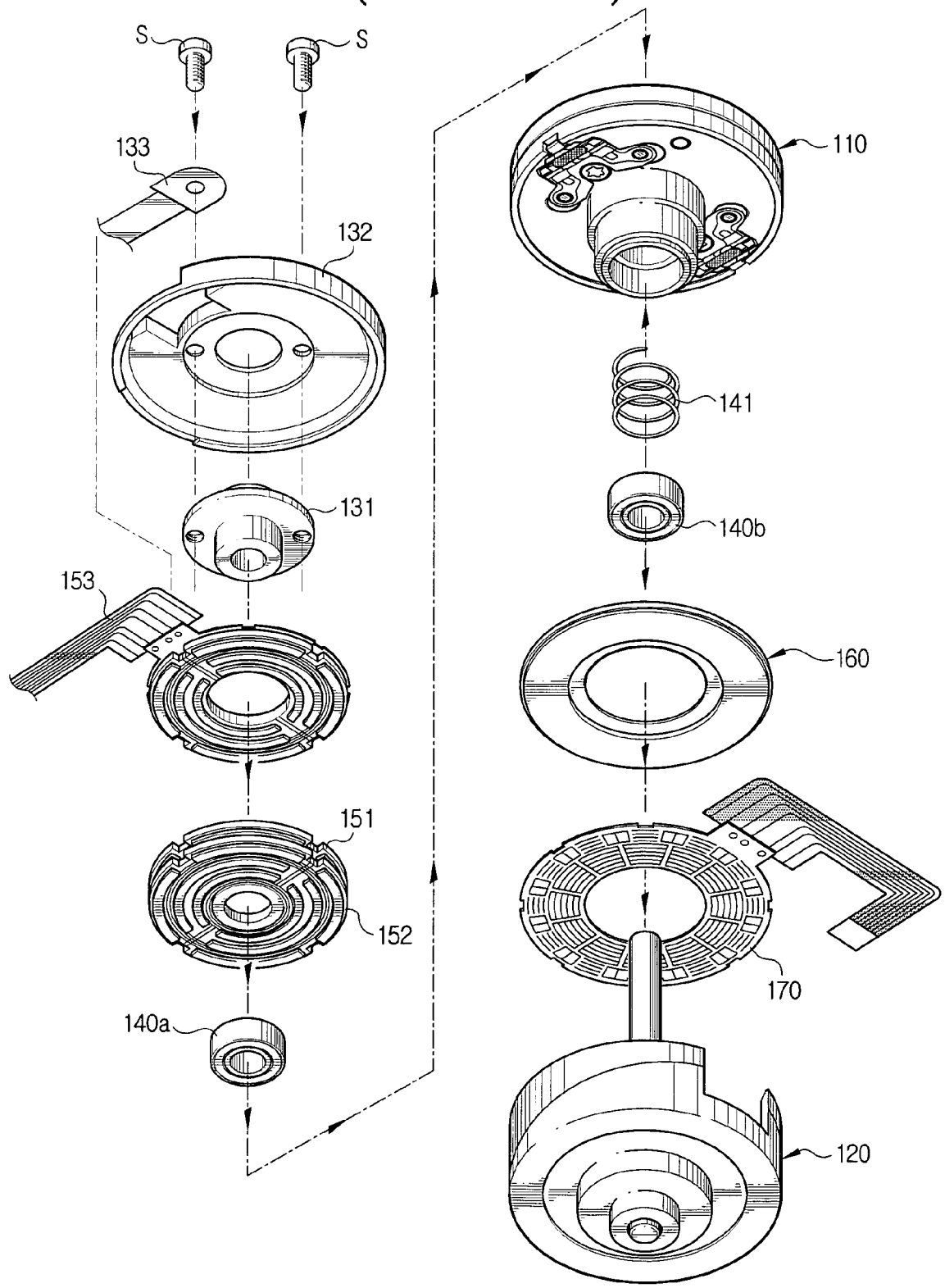
FIG. 1B is an exploded perspective view of the head drum assembly of FIG. 1A.
Figure 2A:
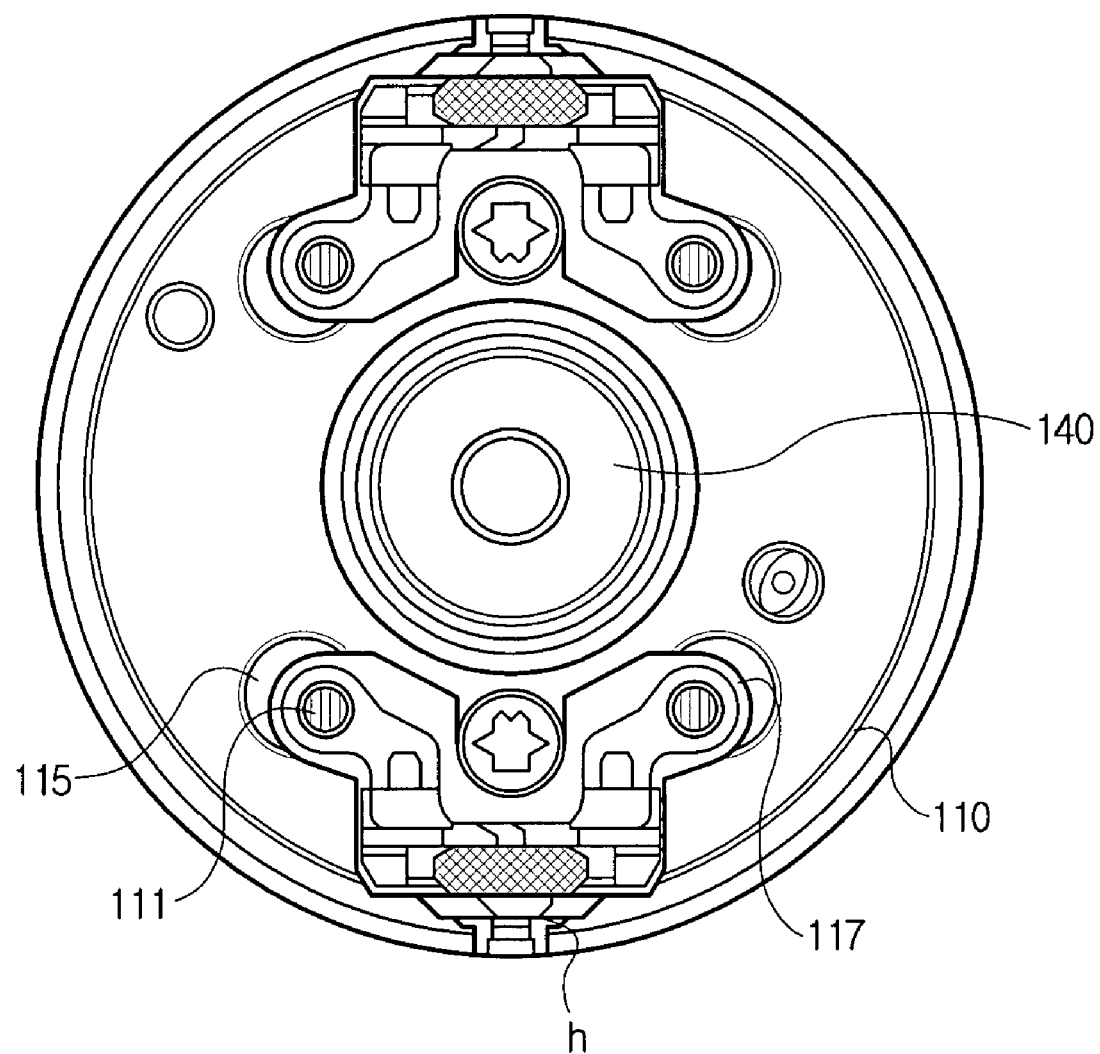
FIG. 2A is a bottom view illustrating the rotary drum of FIG. 1A.
Figure 2B:
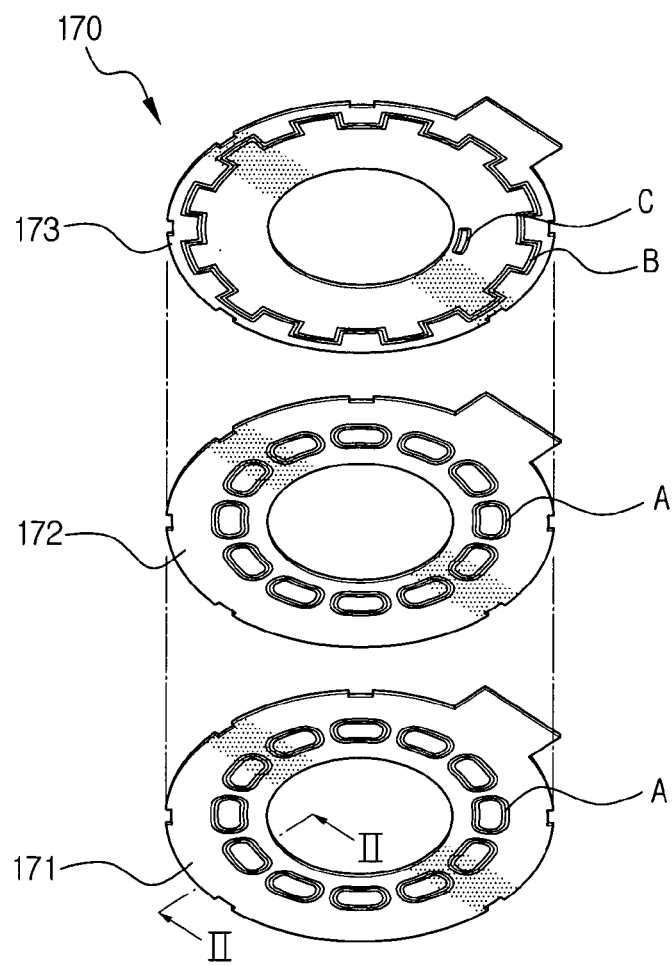
FIG. 2B is a schematic perspective view illustrating the motor stator of FIG. 1A being disassembled.
Figure 2C:
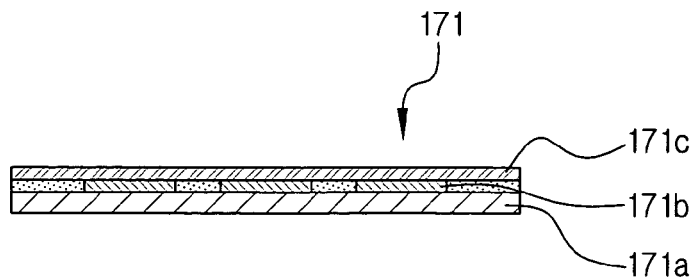
FIG. 2C is a schematic sectional view taken on line II—II of FIG. 2B.
Figure 3A:
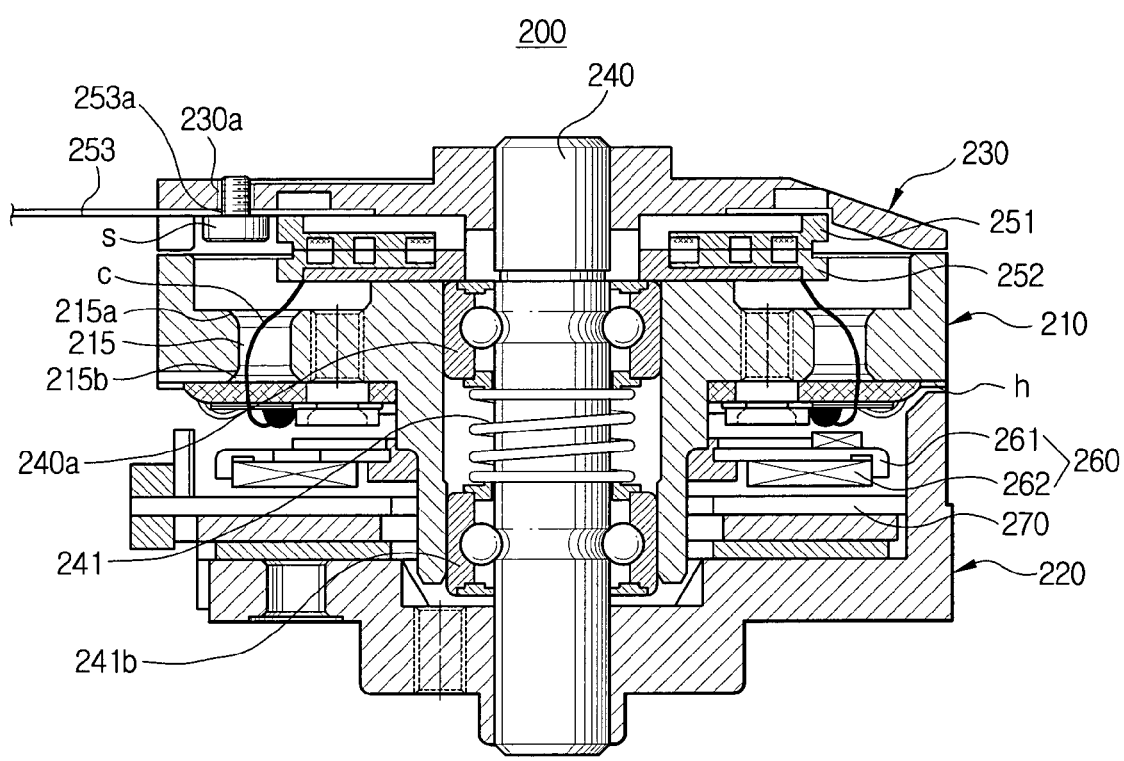
FIG. 3A is a schematic sectional view illustrating a head drum assembly according to a preferred embodiment of the present invention.
Figure 3B:
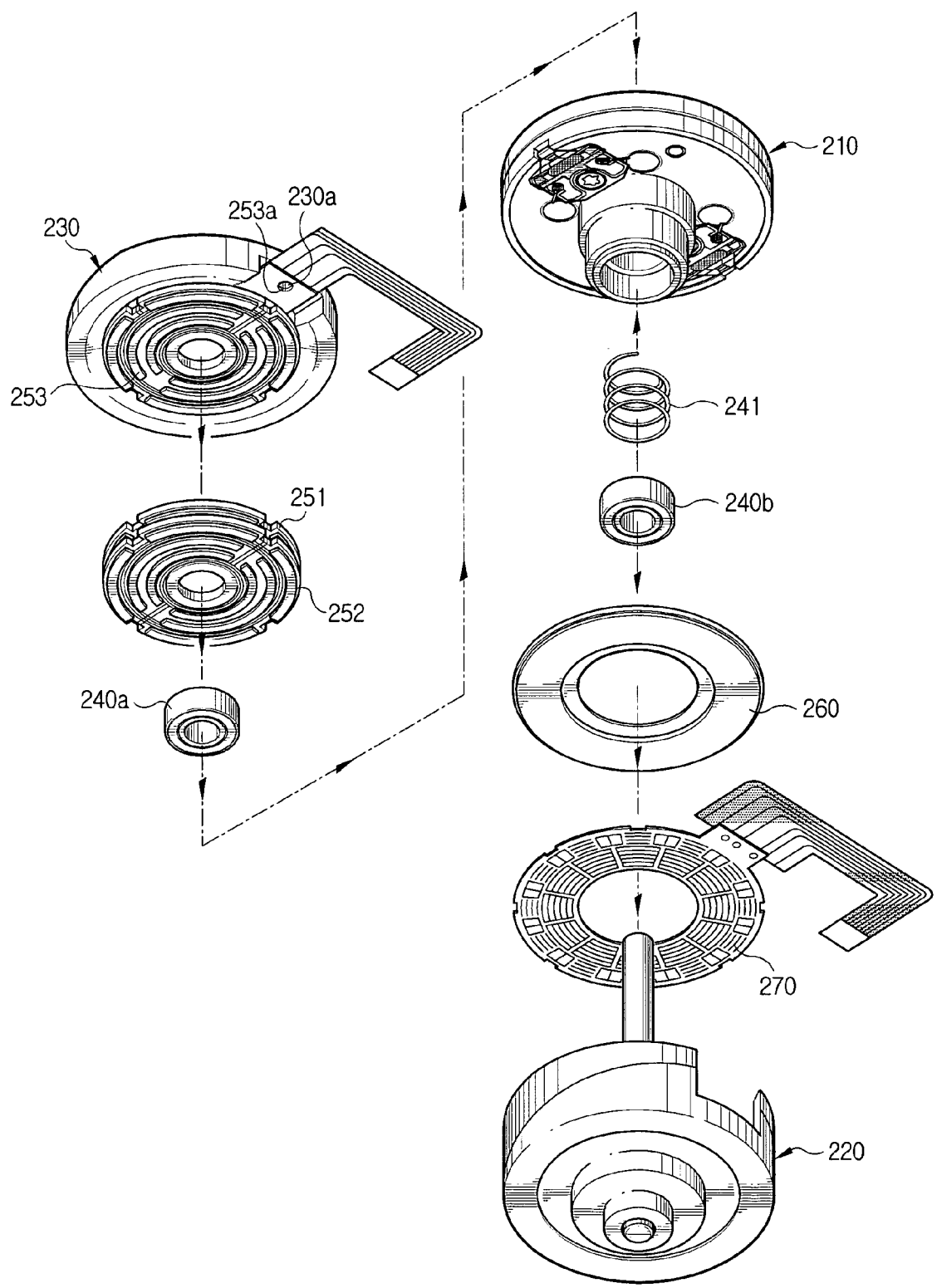
FIG. 3B is an exploded perspective view of the head drum assembly of FIG. 3A.

Referring to FIGS. 3A and 3B, a head drum assembly 200 for a tape recorder according to the present invention includes a rotary drum 210 which rotatably supports a magnetic head (h) thereon to scan and thus record/reproduce data on/from a magnetic tape (not shown), a stationary drum 220 and a drum cover 230 press-fitted to be positioned on the lower and the upper parts of a shaft 240, respectively, with the rotary drum 210 being interposed therebetween. Here, the shaft 240 is disposed in a center axis hole of the rotary drum 210.

The drum cover 230 receives the shaft 240 which is press-fitted in a shaft hole defined therein, to be disposed on the rotary drum 210. The drum cover 230 can be formed by shaping a conductive material such as an aluminum alloy. More preferably, the drum cover 230 is made of the same material as that of the rotary drum 210 and the stationary drum 230.

According to an embodiment of the present invention, the drum cover 230 and the sub circuit board 253 are each provided with connecting holes 230a, 230b, respectively, that corresponds to each other. Accordingly, as the screws (s) are fastened into the connecting holes 230a, 230b, the drum cover 230 and the sub circuit board 253 are supported in an electric connection.

As described above, because the drum cover 230 is formed of a conductive material, the drum cover 230 and the sub circuit board 253 can be electrically connected simply by the screws (s), and the drum cover 230 itself can function as the earth plate.

By the above-described structure, the need for a conductive bushing member and an earth plate which were usually required in the drum cover 230 can be omitted, and the number of screws (s) for connecting these parts is also reduced. As a result, the conductive drum cover 230 can be provided as one simple element.

Stationary transformer 251 and rotary transformer 252 (which faces the stationary transformer 251), are provided to the upper part of the rotary drum 210 and to the lower part of the drum cover 230, respectively. The transformers 251, 252 provide signal transmission between the magnetic head (h) and the sub circuit board 253.

The rotary transformer 252 is attached to the upper part of the rotary drum 210. On the rotary drum 210, there is the drum cover 230 fixed to the shaft 240. The stationary transformer 251 is attached to the lower part of the drum cover 230 to face the rotary transformer 252. The rotary transformer 252 sends and receives signals with the stationary transformer 251 in a non-contact manner. Accordingly, data reproduced or to be recorded by the magnetic head (h) can be transmitted through the respective transformers 251, 252.

To this end, the coil (c) of the rotary transformer 252 has to be connected to the magnetic head (h), and accordingly, there is a linking hole 215 vertically penetrating the rotary drum 210. As shown in FIG. 3A, a pair of linking holes 215 are symmetrically formed at the right and the left sides with respect to the magnetic head (h). The coil (c) is passed through the linking holes 215 and is directly connected to the magnetic head (h) by soldering. As a result, in the case where there is a pair of magnetic heads (h) employed, a total of four soldering steps are performed: two soldering steps for each coil (c) of each magnetic head (h). Generally, the surface of the coil (c) is coated with enamel for the purpose of insulation. In order to prevent the coating from peeling off by contact with the rotary drum 210, the upper/lower entry/exit parts 215a, 215b of the linking holes 215 are preferably rounded. By having the entry and exit parts 215a, 215b rounded, instead of angular, the peel-off of the coating layer of the coil (c) by the contact can be prevented.

In addition, a motor stator 270 is disposed in the upper part of the stationary drum 220, and a motor rotor 260 is disposed in the lower surface of the rotary drum 210 to oppose the motor stator 270 and rotate. The motor rotor 260 has a donut-shaped magnet 262 disposed inside a ring-type rotor casing 261.

Figure 4A:
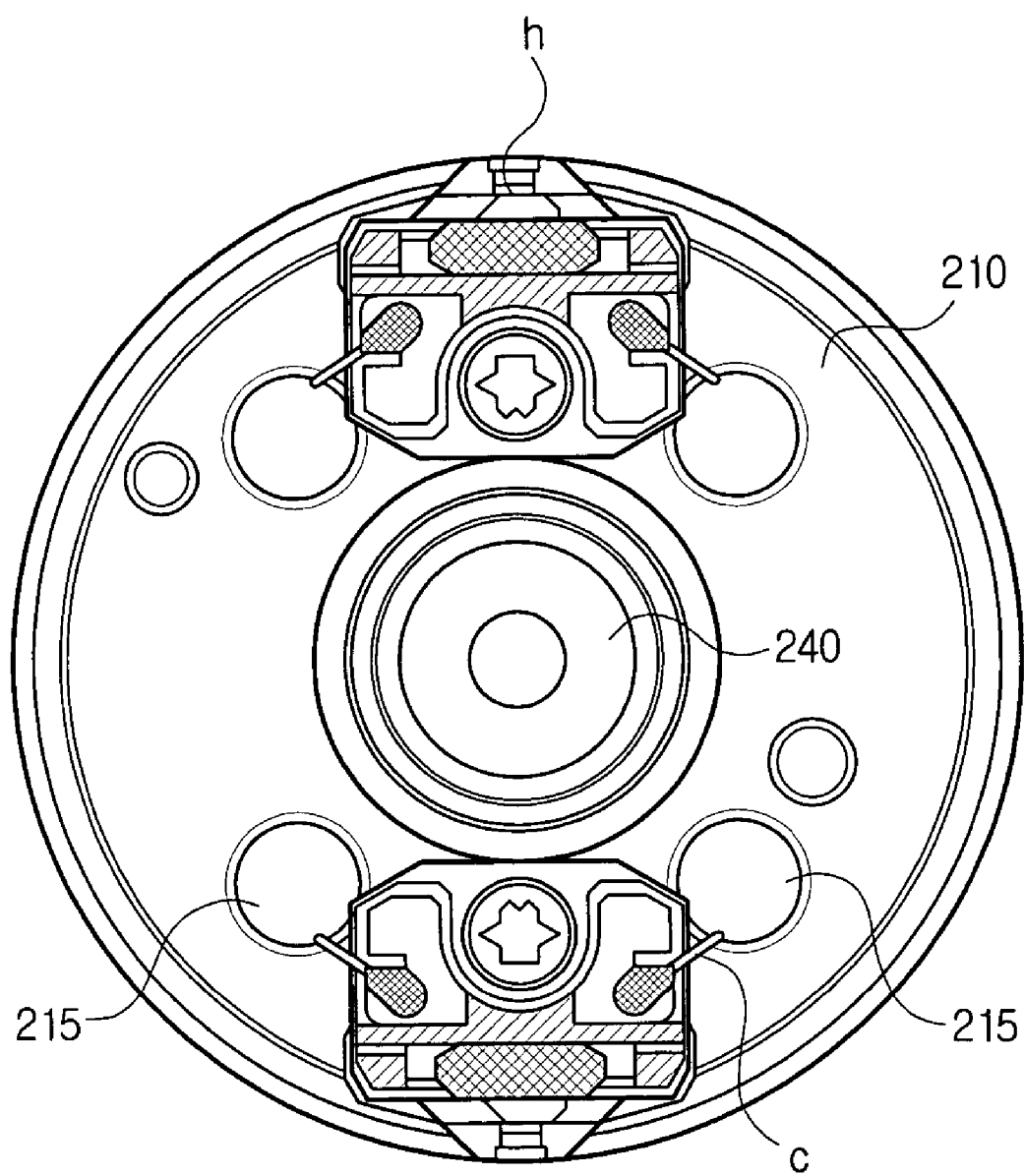
FIG. 4A is a bottom view of the rotary drum of FIG. 3A.
Figure 4B:
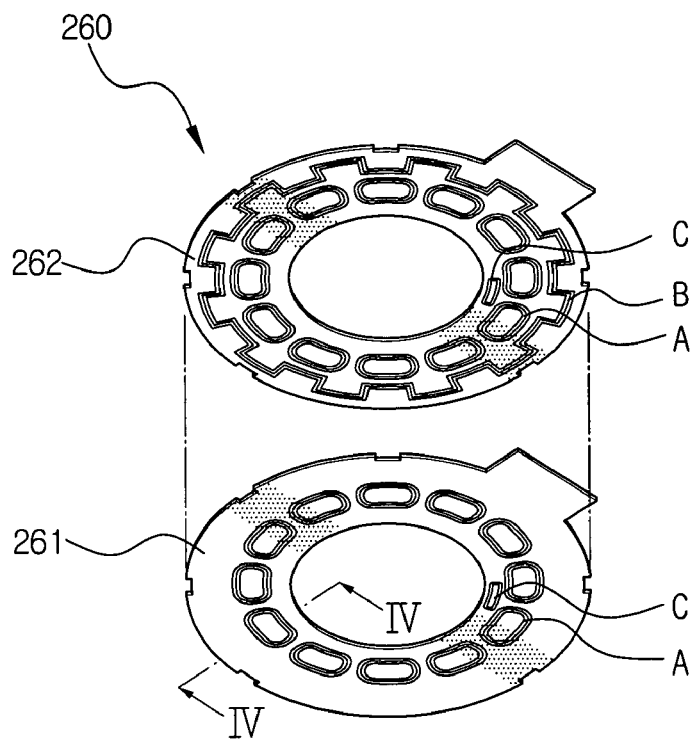
FIG. 4B is a schematic perspective view illustrating the motor stator of FIG. 3A being disassembled.

The motor stator 270, which is one of the main features of an embodiment of the present invention, is formed of the type in which the so-called "FP coil (fine pattern coil)" is formed into a disc pattern and disposed to face the donut-type magnet 162, to obtain a more compact-sized head drum assembly. As shown in FIG. 4B, the motor stator 270 has the two-layered structure which consists of a lower substrate 261 and an upper substrate 262 stacked on the lower substrate 261. In the upper and the lower substrates 262, 261, there are a torque generation coil pattern (A), a frequency generation coil pattern (B) for speed control and a phase generation coil pattern (C) for phase control formed in various shapes and in combination with one another.

According to a preferred embodiment of the present invention, as shown in FIG. 4B, the torque generation coil pattern (A) and the phase generation (PG) coil pattern (C) for phase control are formed dispersely on the upper and the lower substrates 262, 261, while the frequency generation (FG) coil pattern (B) for speed control is formed on the upper substrate 262.

According to another aspect of an embodiment of the present invention, albeit not shown, a predetermined torque generation coil pattern may be formed dispersely on the upper and the lower substrates 262, 261, while there is the PG coil pattern (C) on one of the upper substrate and lower substrate 262, 261 and the FG coil pattern (B) on the other substrate 262, 261. Additionally, various other combinations of the patterns are also possible.

Figure 4C:
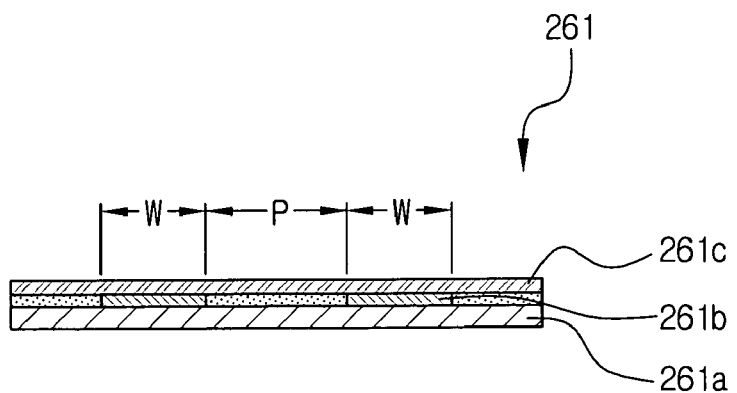
FIG. 4C is a schematic sectional view taken on line IV—IV of FIG. 4B.

According to yet another aspect of an embodiment of the present invention, as shown in FIG. 4C, preferably, each of the upper and the lower substrates 262, 261 is formed by coating a copper membrane 261b of a predetermined fine pattern on an epoxy substrate 261a, i.e., on a base plate, and forming a protective layer 261c thereon. The copper layer 261b may be formed in width (W) from at or about 10 μm to at or about 20 μm, and the pitch (P) between the respective copper layers 261b ranges from at or about 90 μm to at or about 100 μm.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A head drum assembly for a tape recorder, comprising:
    a rotary drum supporting a magnetic head thereon, and being rotatably disposed on a shaft;
    a stationary drum and a drum cover secured to the shaft to be positioned vertically on lower and upper parts of the rotary drum with the rotary drum being interposed therebetween;

a sub circuit board, a stationary transformer and a rotary transformer, each being disposed between the stationary drum and the rotary drum for signal transmission with the magnetic head;

a motor stator mounted on the stationary drum; and a motor rotor disposed in the rotary drum to oppose the motor stator and rotate, wherein the drum cover is formed of a conductive material and press-fitted on the shaft, and a connecting member is disposed on the conductive body of the drum cover for supporting and electrically connecting the sub circuit board with the conductive body.

2. The head drum assembly of claim 1, wherein the drum cover is formed of the same material as that of the rotary drum and the stationary drum.

3. The head drum assembly of claim 1, wherein the connecting member is a screw fastened to coupling holes which are respectively formed in the drum cover and in the sub circuit board to correspond to each other.

4. The head drum assembly of claim 1, wherein the rotary drum has a linking hole vertically penetrating therein, and a coil of the rotary transformer is passed through the linking hole and directly connected to the magnetic head by soldering.

5. The head drum assembly of claim 4, wherein an entry part and an exit part at the upper and the lower parts of the linking hole are rounded.

6. The head drum assembly of claim 4, wherein the linking hole is formed symmetrically with respect to the magnetic head.

7. The head drum assembly of claim 4, wherein the motor stator is formed in a two-layered structure having a lower substrate and an upper substrate stacked on the lower substrate, and combinations of a torque generation coil pattern, a frequency generation coil pattern for speed control and a phase generation coil pattern for phase control are formed on the upper and the lower substrates, respectively.

8. The head drum assembly of claim 7, wherein the torque generation coil pattern is formed dispersely on the upper and the lower substrates, and the phase generation coil pattern for phase control is formed on one of the upper and the lower substrates and the frequency generation coil pattern for speed control is formed on the other.

9. The head drum assembly of claim 7, wherein the torque generation coil pattern and the phase generation coil pattern are formed dispersely on the upper and the lower substrates, and the frequency generation coil pattern is formed on the upper substrate.

10. The head drum assembly of claim 7, wherein each of the upper and the lower substrates has a copper layer in a predetermined pattern which is formed on a base plate, and a protective layer formed on the copper layer, and the copper layers of the upper and the lower substrates are connected with each other through a passing hole formed in the upper substrate.

11. The head drum assembly of claim 10, wherein the copper layer is formed in width from about 10 μm to about 20 μm, and a pitch between the respective copper layers ranges from about 90 μm to about 100 μm.

12. The head drum assembly of claim 1, wherein the motor stator is formed in a two-layered structure having a lower substrate and an upper substrate stacked on the lower substrate, and combinations of a torque generation coil pattern, a frequency generation coil pattern for speed control and a phase generation coil pattern for phase control are formed on the upper and the lower substrates, respectively.

13. The head drum assembly of claim 12, wherein the torque generation coil pattern is formed dispersely on the upper and the lower substrates, and the phase generation coil pattern for phase control is formed on one of the upper and the lower substrates and the frequency generation coil pattern for speed control is formed on the other.

14. The head drum assembly of claim 12, wherein the torque generation coil pattern and the phase generation coil pattern are formed dispersely on the upper and the lower substrates, and the frequency generation coil pattern is formed on the upper substrate.

15. The head drum assembly of claim 12, wherein each of the upper and the lower substrates has a copper layer in a predetermined pattern which is formed on a base plate, and a protective layer formed on the copper layer, and the copper layers of the upper and the lower substrates are connected with each other through a passing hole formed in the upper substrate.

16. The head drum assembly of claim 15, wherein the copper layer is formed in width from about 10 μm to about 20 μm, and a pitch between the respective copper layers ranges from about 90 μm to about 100 μm.

* * * * *